(12) United States Patent
Lu

(10) Patent No.: US 8,878,726 B2
(45) Date of Patent: Nov. 4, 2014

(54) SYSTEM AND METHOD FOR THREE-DIMENSIONAL GEOLOCATION OF EMITTERS BASED ON ENERGY MEASUREMENTS

(75) Inventor: Ning Hsing Lu, Clifton, NJ (US)

(73) Assignee: Exelis Inc., McLean, VA (US)

( * ) Notice: Subject to any disclaimer, the term of this patent is extended or adjusted under 35 U.S.C. 154(b) by 307 days.

(21) Appl. No.: 13/049,443

(22) Filed: Mar. 16, 2011

(65) Prior Publication Data

US 2012/0235864 A1    Sep. 20, 2012

(51) Int. Cl.
G01S 3/02 (2006.01)
G01S 11/06 (2006.01)
G01S 5/02 (2010.01)

(52) U.S. Cl.
CPC .............. *G01S 5/0242* (2013.01); *G01S 11/06* (2013.01); *G01S 5/0289* (2013.01)
USPC ....................................................... 342/465

(58) Field of Classification Search
CPC ....................................................... G01S 5/04
USPC ....................................................... 342/365
See application file for complete search history.

(56) References Cited

U.S. PATENT DOCUMENTS

| | | | |
|---|---|---|---|
| 4,797,839 A | 1/1989 | Powell | |
| 5,055,851 A * | 10/1991 | Sheffer | 342/457 |
| 5,767,804 A | 6/1998 | Murphy | |
| 5,987,329 A | 11/1999 | Yost et al. | |
| 6,018,312 A * | 1/2000 | Haworth | 342/353 |
| 6,141,558 A | 10/2000 | Chen | |
| 6,259,404 B1 * | 7/2001 | Parl et al. | 342/457 |
| 6,414,634 B1 * | 7/2002 | Tekinay | 342/453 |
| 6,865,490 B2 | 3/2005 | Cauwenberghs et al. | |
| 7,071,791 B1 | 7/2006 | Wilson, III | |
| 7,292,189 B2 * | 11/2007 | Orr et al. | 342/465 |
| 7,564,408 B2 * | 7/2009 | Glockler et al. | 342/463 |
| 7,616,155 B2 | 11/2009 | Bull et al. | |
| 7,623,871 B2 * | 11/2009 | Sheynblat | 455/456.1 |
| 8,615,190 B2 | 12/2013 | Lu | |
| 8,723,730 B2 | 5/2014 | Lu et al. | |
| 2001/0053699 A1 * | 12/2001 | McCrady et al. | 455/513 |
| 2003/0204380 A1 | 10/2003 | Dishman et al. | |
| 2004/0029558 A1 | 2/2004 | Liu | |
| 2004/0174258 A1 | 9/2004 | Edelstein et al. | |
| 2004/0233100 A1 | 11/2004 | Dibble et al. | |
| 2005/0032531 A1 | 2/2005 | Gong et al. | |

(Continued)

FOREIGN PATENT DOCUMENTS

EP    2530862 A1    12/2012
WO    2007063537 A1    6/2007

OTHER PUBLICATIONS

Wikipedia Article, "Multilateration", Feb. 17, 2010 version.*
Wikepedia Article, "Trilateration", Feb. 9, 2010 version.*

(Continued)

*Primary Examiner* — Frank J McGue
(74) *Attorney, Agent, or Firm* — Edell, Shapiro & Finnan, LLC

(57) ABSTRACT

According to an embodiment of the present invention, a three-dimensional (3-D) energy-based emitter geolocation technique determines the geolocation of a radio frequency (RF) emitter based on energy or received signal strength (RSS) of transmitted signals. The technique may be employed with small unmanned air vehicles (UAV), and obtains reliable geolocation estimates of radio frequency (RF) emitters of interest.

18 Claims, 5 Drawing Sheets

(56) References Cited

U.S. PATENT DOCUMENTS

| | | | |
|---|---|---|---|
| 2005/0077424 A1 | 4/2005 | Schneider | |
| 2005/0242995 A1 | 11/2005 | Ferreol et al. | |
| 2005/0281363 A1* | 12/2005 | Qi et al. | 375/349 |
| 2006/0038677 A1 | 2/2006 | Diener et al. | |
| 2006/0128311 A1 | 6/2006 | Tesfai | |
| 2006/0240839 A1 | 10/2006 | Chen et al. | |
| 2007/0069949 A1 | 3/2007 | Ferreol et al. | |
| 2007/0115175 A1 | 5/2007 | Velicer et al. | |
| 2008/0129600 A1 | 6/2008 | Thomas | |
| 2008/0186235 A1 | 8/2008 | Struckman et al. | |
| 2009/0146881 A1 | 6/2009 | Mesecher | |
| 2010/0034133 A1 | 2/2010 | Marom et al. | |
| 2010/0106745 A1* | 4/2010 | Cho et al. | 707/802 |
| 2010/0151810 A1 | 6/2010 | Besoli et al. | |
| 2010/0190507 A1 | 7/2010 | Karabinis et al. | |
| 2010/0284359 A1 | 11/2010 | Kim et al. | |
| 2010/0321242 A1 | 12/2010 | Robinson et al. | |
| 2011/0018766 A1 | 1/2011 | Steer et al. | |
| 2011/0199916 A1 | 8/2011 | Garrett et al. | |
| 2012/0293371 A1 | 11/2012 | Lu | |
| 2012/0309288 A1 | 12/2012 | Lu | |
| 2013/0027251 A1 | 1/2013 | Lu | |

OTHER PUBLICATIONS

Robinson et al., "Received Signal Strength Based Location Estimation of a Wireless LAN Client", IEEE Communications Society, Wireless Communications and Networking Conference 2005.*

Xinrong Li, "RSS-Based Location Estimation With Unknown Pathloss Model", IEEE Transactions on Wireless Communications, vol. 5, No. 12, Dec. 2006; pp. 3626-3633.

Ralph O. Schmidt, "Multiple Emitter Location and Signal Parameter Estimation", IEEE Transactions on Antennas and Propagation, vol. AP-34, No. 3, Mar. 1986; pp. 276-280.

George V. Serebryakov, "Direction-of-Arrival Estimation of Correlated Sources by Adaptive Beamforming", IEEE Transactions on Signal Processing, vol. 43, No. 11, Nov. 1995; pp. 2782-2787.

Yihong Qi et al., "On Time-of-Arrival Positioning in a Multipath Environment", IEEE Transactions on Vehicular Technology, vol. 55, No. 5, Sep. 2006; pp. 1516-1526.

A. Tennant et al., "Direction Finding Using a Four-Element Time-Switched Array System", 2008 Loughborough Antennas & Propagation Conference; Mar. 17-18, 2008, Loughborough, UK; 2008 IEEE; pp. 181-184.

A. Tennant et al., "A Two-Element Time-Modulated Array With Direction-Finding Properties", IEEE Antennas and Wireless Propagation Letters, vol. 6, 2007; pp. 64-65.

Harry Urkowitz, "Energy Detection of Unknown Deterministic Signals", Proceedings of the IEEE, vol. 55, No. 4, Apr. 1967; pp. 523-531.

Ning H. Lu, "Linearized, Unified Two-Ray Formulation for Propagation over a Plane Earth", Sicon/05- Sensors for Industry Conference; Houston, Texas, USA, Feb. 8-10, 2005.

Guolin Sun et al., "Signal Processing Techniques in Network-Aided Positioning", IEEE Signal Processing Magazine [12] Jul. 2005.

Bo-Chieh Liu et al., "Analysis of Hyperbolic and Circular Positioning Algorithms Using Stationary Signal-Strength-Difference Measurements in Wireless Communications", IEEE Transactions on Vehicular Technology, vol. 55, No. 2, Mar. 2006; pp. 499-509.

Ada S. Y. Poon et al., "Degrees of Freedom in Multiple-Antenna Channels: A Signal Space Approach", IEEE Transaction Information Theory Society, vol. 51, Issue 2.

Seungjin Choi, "Blind Source Separation and Independent Component Analysis: A Review", Neural Information Processing-Letters and Review, Vol. 6, No. 1, Jan. 2005, pp. 1-57.

Ludwig Rota et al., "Parallel Deflation with Alphabet-Based Criteria for Blind Source Extraction", Proc. SSP-2005, 13th IEEE Workshop on Statistical Signal Processing, Jul. 2005, pp. 1-5.

J. Durbin et al., "Time series analysis of non-Gaussian observations based on state space models from both classical and Bayesian perspectives", Dec. 1998, pp. 1-26.

Shlomo Dubnov, "Generalization of Spectral Flatness Measure for Non-Gaussian Linear Processes", Oct. 30, 2002, pp. 1-6.

M. Ryyan Khan et al., "Iterative Noise Power Subtraction Technique for Improved SNR in Speech Enhancement", pp. 1-3.

Fredrik Gustafsson et al., "Positioning Using Time-Difference of Arrival Measurements", pp. 1-4.

Lu, "A Signal-to-Noise Ratio Enhancer", SAS 2011—IEEE Sensors Application Symposium, Feb. 22-24, 2011, 5 pages.

European Search Report, EP12159186, Jul. 11, 2012, 6 pages.

European Search Report, EP12166722, Sep. 12, 2012, 6 pages.

European Search Report, EP12166578, Oct. 1, 2012, 6 pages.

Cardoso, "Blind Signal Separation: Statistical Principles", Proceedings of the IEEE, vol. 86, No. 10, Oct. 1998, pp. 2009-2025.

Buchner et al., "A Generalization of Blind Source Separation Algorithms for Convolutive Mixtures Based on Second-Order Statistics," IEEE Trans. on Speech and Audio Processing, vol. 13, No. 1, Jan. 2005, pp. 120-134.

Ukai et al, "Multistage SIMO-Model-Based Blind Source Separation Combining Frequency Domain ICA and Time Domain ICA," IEEE International Conference on Acoustics, Speech, and Signal Processing, vol. 4, 2004, pp. 109-112.

Aichner et al., "Post Processing for Convolutive Blind Source Separation," Proc. IEEE International Conf. Acoustics, Speech, Signal Processing (ICASSP), vol. 5, pp. 37-40, May 2006.

"Pursuing A Lost Course", Electronics World, Nexus Media Communications, Swanley, Kent, GB, vol. 97, No. 1674, May 1, 1992, pp. 424-427, XP000290553, ISSN: 0959-8332.

European Search Report, Application No. EP12177418, Munich, Germany, Dec. 13, 2013, 6 pages.

* cited by examiner

SYSTEM AND METHOD FOR THREE-DIMENSIONAL GEOLOCATION OF EMITTERS BASED ON ENERGY MEASUREMENTS

BACKGROUND

1. Technical Field

The present invention embodiments pertain to determining locations of emitters. In particular, the present invention embodiments pertain to determining locations of radio frequency (RF) emitters in a three-dimensional space based on energy or received signal strength (RSS) measurements of the emitters at various locations.

2. Discussion of Related Art

Conventional techniques for geolocation of a radio frequency (RF) emitter are commonly based on measurements of a received signal strength (RSS) of signals transmitted from the emitter. Accordingly, this RSS-based technique may also be referred to as an energy-based technique. The received signal strength (RSS) is usually integrated over the duration of the transmitted signal in order to obtain a signal energy measurement and enhance signal to noise ratio. Since the transmitted radio frequency (RF) signal attenuates during propagation through space, the received signal strength (RSS) of the signal may be used to estimate the distance from the receiver to the emitter. However, this technique may not be very accurate due to multipath fading and shadowing effects that may significantly distort the expected received signal strength (RSS).

In order to improve the accuracy, the received signal strength (RSS) or energy-based geolocation technique may employ a radio frequency (RF) propagation map of the environment. The map is basically a database with information created from known terrain data and learned from observed energy measurements at different combinations of emitter and receiver locations. The improved geolocation technique determines the best fit in the energy space to potential emitter locations based on the radio frequency (RF) propagation map. However, this improved technique requires a large number of real-time measurements and/or terrain modeling. Thus, this technique can only be used in applications in which the radio frequency (RF) propagation map is available, and sufficient computing capacity exists to process the large amount of data.

SUMMARY

An embodiment of the present invention pertains to a three-dimensional (3-D) energy-based emitter geolocation technique that determines the geolocation of a radio frequency (RF) emitter based on energy or received signal strength (RSS) of transmitted signals. The technique may be employed with small unmanned air vehicles (UAV), and obtains reliable geolocation estimates of radio frequency (RF) emitters of interest.

Present invention embodiments provide several advantages. For example, the technique of present invention embodiments provides the simplicity and the performance robustness required by a low-cost, compact system. The use of a small unmanned air vehicle (UAV) provides a cost-effective manner to reliably measure received signal strength (RSS) data generated from the radio frequency (RF) emitter of interest. Further, a Line-of-Sight (LOS) condition offered by the unmanned air vehicle (UAV) minimizes errors from path loss modeling and the effects from signal fading and shadowing. Each RSS measurement that feeds the geolocation algorithm is the measurement with the maximum signal to noise ratio selected from a block of consecutive RSS data (which is referred to herein as the maximum signal to noise ratio (MSNR) rule). The block size can be determined using the assessment of the spaced-frequency spaced-time correlation function of the propagation channel. The MSNR rule further enhances the quality of the RSS measurements used by the geolocation algorithm. In addition, the combination of the technique with the use of an unmanned air vehicle (UAV) enables an overall system to be small, compact, flexible, reliable, and of low-cost.

The above and still further features and advantages of present invention embodiments will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

Embodiments of the present invention pertain to a three-dimensional (3-D) energy-based geolocation technique that obtains reliable geolocation estimates of a radio frequency (RF) emitter based on energy or received signal strength (RSS) of transmitted signals. The geolocation of a radio frequency (RF) emitter is a critical need for many applications. The technique of present invention embodiments may be employed with unmanned air vehicles (UAV) that are usually small, utilized for low altitudes, and employ typical guidance technologies for operation (e.g., following pre-planned or manually provided paths or waypoints). These types of vehicles are well suited for enabling three-dimensional (3-D) geolocation of radio frequency (RF) emitters of interest.

Figure 1:
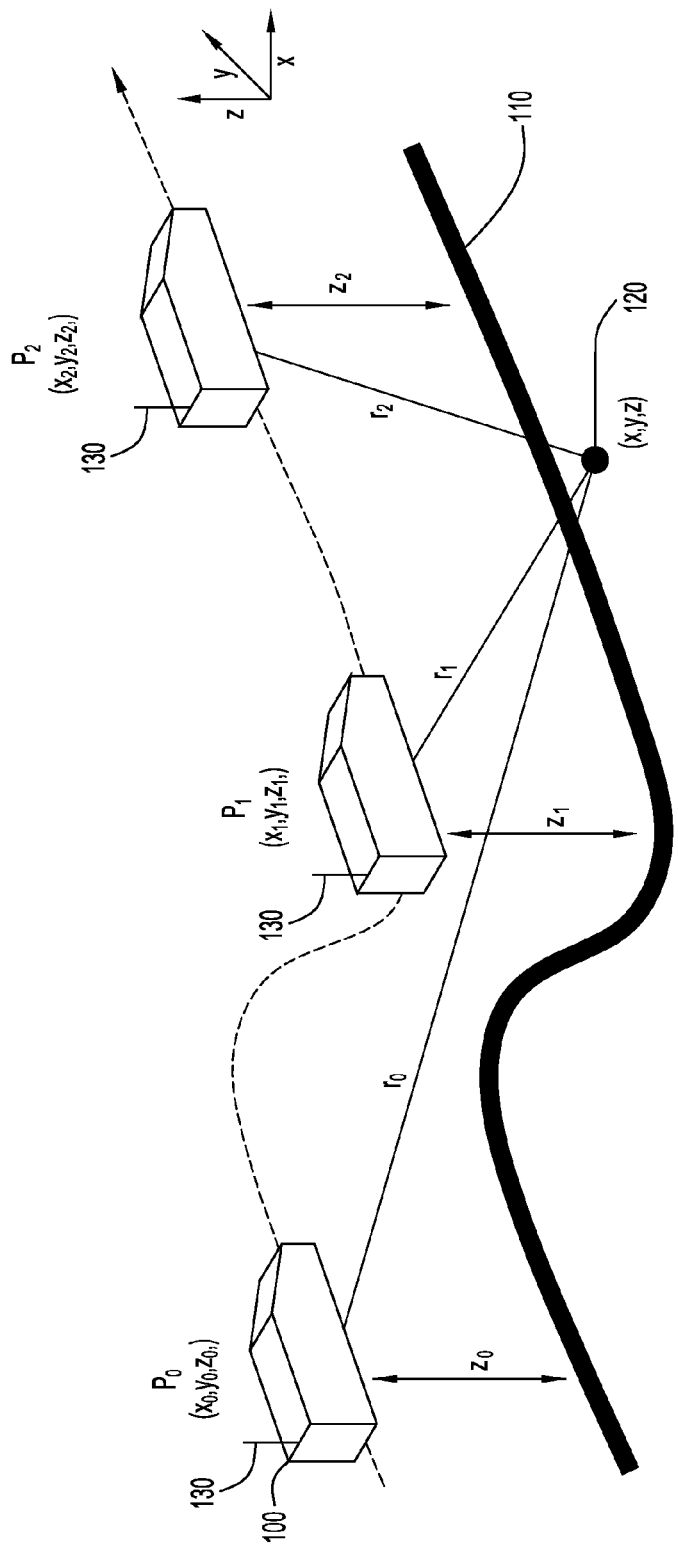
FIG. 1 is a diagrammatic illustration of an example environment for determining geolocation of a radio frequency (RF) emitter according to an embodiment of the present invention.

An example environment for determining the geolocation of a radio frequency (RF) emitter in a three-dimensional space is illustrated in FIG. 1. Specifically, the environment includes a radio frequency (RF) emitter 120, and a mobile sensor 100 (e.g., an unmanned air vehicle (UAV) or other platform with a radio frequency (RF) sensor, etc.). The mobile sensor travels along a pre-planned path 110 (e.g., a pre-planned flight path in the case of an unmanned air vehicle (UAV)). Mobile sensor 100 includes an antenna 130 that receives signals from radio frequency (RF) emitter 120 in order to measure the strength of those signals as described below. The radio frequency (RF) emitter and mobile sensor are located within a three-dimensional space of the environment (e.g., defined by X, Y, and Z axes as illustrated in FIG. 1). Locations within the three-dimensional space may be represented by coordinates that indicate a position along each of the respective X, Y, and Z axes. By way of example, radio frequency (RF) emitter 120 is positioned at an unknown location (x, y, z) within the three-dimensional space, while mobile sensor 100 receives signals transmitted from the radio frequency (RF) emitter at known locations along path 110 within the three-dimensional space (e.g., locations $(x_0, y_0, z_0)$, $(x_1, y_1, z_1)$, and $(x_2, y_2, z_2)$ as viewed in FIG. 1). The Z axis represents the height or altitude, and indicates the offset between the mobile sensor and pre-planned path 110 (e.g., distances $z_0, z_1, z_2$ as viewed in FIG. 1).

Mobile sensor 100 measures at selected locations (e.g., $(x_0, y_0, z_0)$, $(x_1, y_1, z_1)$, and $(x_2, y_2, z_2)$ as viewed in FIG. 1) the received signal strength (RSS) (e.g., $p_0, p_1, p_2$ as viewed in FIG. 1) of radio frequency (RF) signals emitted by emitter 120. The received signal strength (RSS) at each location is proportional to the distance (e.g., $r_0, r_1, r_2$ as viewed in FIG. 1) between that location and radio frequency (RF) emitter 120. The received signal strength (RSS) measurement can be viewed as a special case of the signal energy in which only a single signal sample is used for the measurement at each location. Each RSS measurement that feeds the geolocation algorithm is the measurement with the maximum signal to noise ratio selected from a block of consecutive RSS data (which is referred to herein as the maximum signal to noise ratio (MSNR) rule). The block size can be determined using the assessment of the spaced-frequency spaced-time correlation function of the propagation channel.

Once mobile sensor 100 collects the received signal strength (RSS) measurements, the geolocation estimate of radio frequency (RF) emitter 120 is determined based on those measurements as described below. The received signal strength (RSS) measurements may be collected by using an unmanned air vehicle (UAV) or other platform along a flight or other pre-planned path, or by using plural unmanned air vehicles (UAV) or other platforms each collecting a measurement at one or more locations along that path. In other words, measurements from plural locations may be ascertained via a single platform traveling to different locations, or via plural platforms each positioned at different locations and networking or otherwise sharing the collected data for the geolocation determination. Since measurement errors exist due to path loss modeling, signal fading, shadowing effects, noise/interference, antenna pattern effects, time-varying channel and transmit power effects, and implementation errors, a Least Mean Square (LMS) technique is preferably employed to determine the location of radio frequency (RF) emitter 120 as described below. Although FIG. 1, by way of example only, indicates measurements at certain locations (e.g., $(x_0, y_0, z_0)$, $(x_1, y_1, z_1)$, and $(x_2, y_2, z_2)$ as viewed in FIG. 1), any quantity of received signal strength (RSS) measurements (e.g., $p_i$, where i=0 to N) may be collected at any corresponding locations $((x_i, y_i, z_i)$, where i=0 to N) within the three-dimensional space.

Present invention embodiments resolve the location of radio frequency (RF) emitter 120 by estimating the energy or received signal strength (RSS) of signals emitted from emitter 120 via the received signal strength (RSS) measurements ascertained from plural locations (e.g., $p_0, p_1, p_2$ measured at locations $(x_0, y_0, z_0)$, $(x_1, y_1, z_1)$, and $(x_2, y_2, z_2)$ as viewed in FIG. 1) along path 110. The received signal strength (RSS) measurements are each proportional to the distance between the location of that measurement and radio frequency (RF) emitter 120 (e.g., $r_0, r_1, r_2$ as viewed in FIG. 1) as described above. The measurements are utilized in a set of simultaneous equations to determine the location of the radio frequency (RF) emitter within the three-dimensional space as described below.

Figure 2:
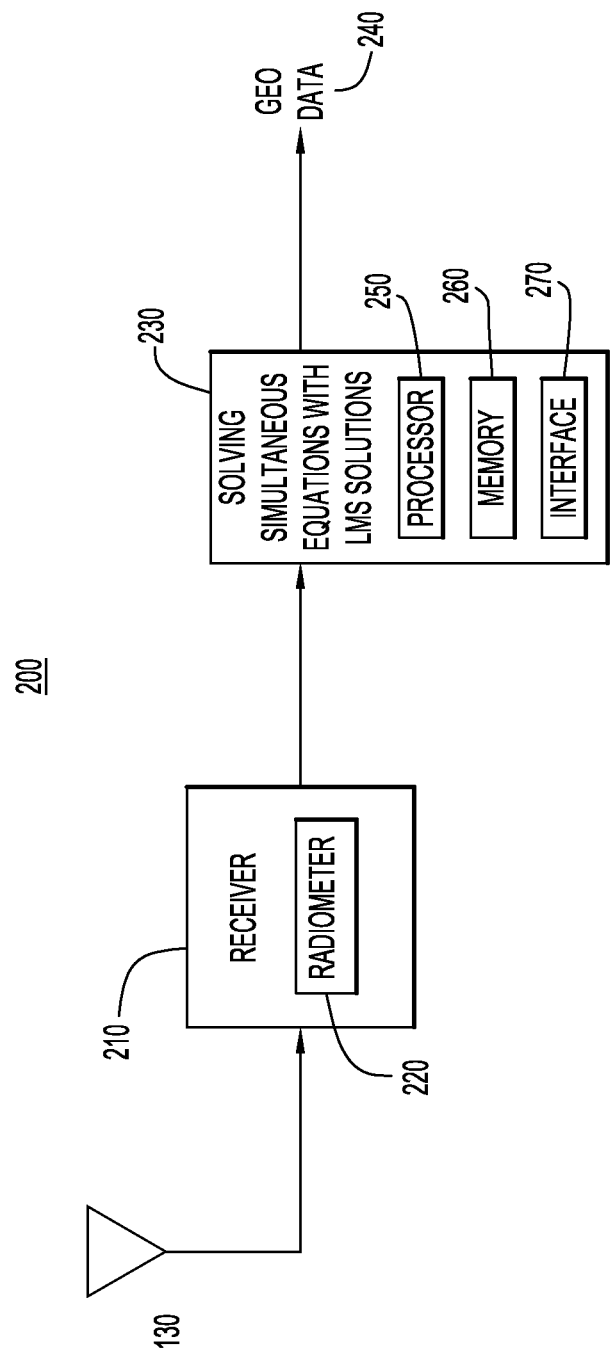
FIG. 2 is a block diagram of a system for determining geolocation of a radio frequency (RF) emitter according to an embodiment of the present invention.

An example system 200 for determining the geolocation of a radio frequency (RF) emitter according to an embodiment of the present invention is illustrated in FIG. 2. Initially, system 200 preferably resides on mobile sensor 100 (FIG. 1) to measure the received signal strength (RSS) and determine the geolocation of the radio frequency (RF) emitter. However, the processing and one or more other portions of system 200 may be remote from the mobile sensor and receive the received signal strength (RSS) measurements for the geolocation determination. In particular, system 200 includes antenna 130, a receiver 210, and a processing device 230. Antenna 130 is preferably implemented by an omni-directional antenna, and directs received signals into receiver 210. The antenna may be implemented by any conventional or other antenna configurable to receive the signals emitted from radio frequency (RF) emitter 120.

Receiver 210 includes a radiometer or energy detector 220 that provides an energy measure (e.g., received signal strength (RSS)) of the signals received from antenna 130. The receiver may be implemented by any conventional or other receiving device capable of receiving the emitted radio frequency (RF) signals, while the radiometer may be implemented by any conventional or other device to measure the energy or received signal strength (RSS) of a received signal. Based on the MSNR rule, the selected, received signal strength (RSS) measurements are provided to processing device 230 to determine the geolocation of radio frequency (RF) emitter 120 as described below.

Processing device 230 may include a processor 250, a memory 260, and an interface unit 270. Processor 250 determines the geolocation of radio frequency (RF) emitter 120 based on the measurements received from receiver 210 and provides corresponding geolocation data 240. The processor includes one or more location modules to determine the location of radio frequency (RF) emitter 120 from a set of simultaneous equations incorporating a Least Mean Square (LMS) technique as described below. The processor may be implemented by any conventional or other computer or processing unit (e.g., a microprocessor, a microcontroller, systems on a chip (SOCs), fixed or programmable logic, etc.), where the one or more location modules may be implemented by any combination of any quantity of software and/or hardware modules or units. Memory 260 may be included within or external of processor 250, and may be implemented by any conventional or other memory unit with any type of memory (e.g., random access memory (RAM), read only memory (ROM), etc.). The memory may store the one or more location modules for execution by processor 250, and data for performing the geolocation technique of present invention embodiments. Interface unit 270 enables communication between system 200 and other devices or systems, and may be implemented by any conventional or other communications device (e.g., wireless communications device, etc.).

Figure 3:
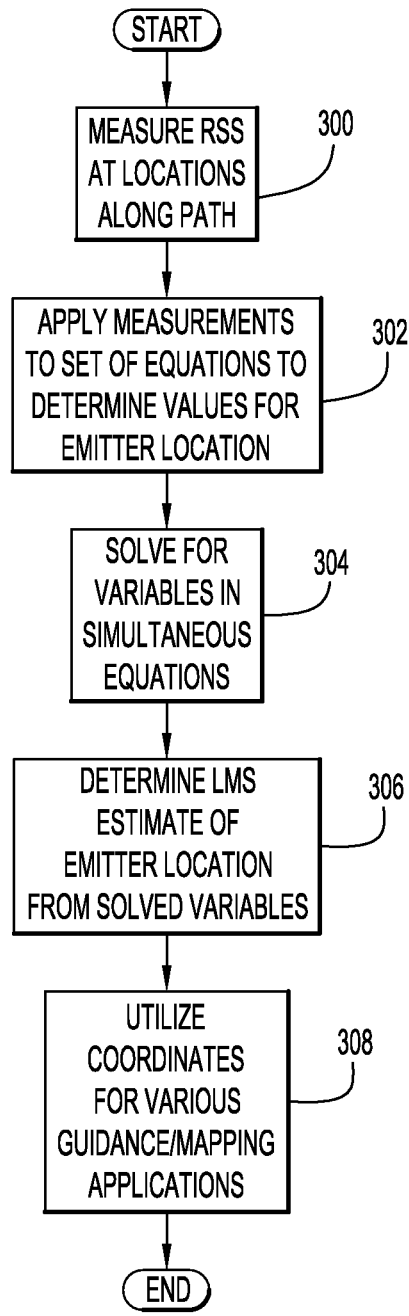
FIG. 3 is a procedural flow chart illustrating a manner in which to determine geolocation of a radio frequency (RF) emitter according to an embodiment of the present invention.

The manner in which processor 250 (e.g., via one or more location modules) determines the geolocation of a radio frequency (RF) emitter based on received signal strength (RSS) at various locations is illustrated in FIGS. 1 and 3. Initially, one or more mobile sensors 100 measure received signal strength (RSS) of signals emitted from radio frequency (RF) emitter 120 at one or more locations (e.g., a quantity of locations from 0 through N as described below) along path 110 at step 300. A set of simultaneous equations to determine the geolocation of the radio frequency (RF) emitter based on the received signal strength (RSS) measurements are determined, and converted into matrix form. In particular, the location of radio frequency (RF) emitter 120 within the three-dimensional space may be represented by the coordinates (x, y, z), while the position of mobile sensor 100 ascertaining a measurement at an $i^{th}$ location along path 110 may be represented by the coordinates $(x_i, y_i, z_i)$. The distance (e.g., $r_i$, as viewed in FIG. 1) in the three-dimensional space between the location of the radio (RF) frequency emitter (e.g., (x, y, z) as viewed in FIG. 1) and the $i^{th}$ measuring location (e.g., $(x_i, y_i, z_i)$), may be expressed as the following:

$$r_i^2 = (x-x_i)^2 + (y-y_i)^2 + (z-z_i)^2; \text{ for } i=0 \text{ to } N. \quad \text{(Equation 1)}$$

The distance (e.g., $d_i$, for i=0 to N) between a reference origin in the three-dimensional space (e.g., (0, 0, 0)) and a location of mobile sensor 100 (e.g., $(x_i, y_i, z_i)$) may be expressed as the following:

$$d_i^2 = x_i^2 + y_i^2 + z_i^2; \text{ for } i=0 \text{ to } N. \quad \text{(Equation 2)}$$

The difference of the square of the distances (e.g., $r_i^2 - r_0^2$) for the $i^{th}$ measuring location (e.g., $(x_i, y_i, z_i)$) and an arbitrary reference location of mobile sensor 100 (e.g., $(x_0, y_0, z_0)$) may be expressed (based on Equations 1 and 2) as the following:

$$r_i^2 - r_0^2 = d_i^2 - d_0^2 - 2x(x_i - x_0) - 2y(y_i - y_0) - 2z(z_i - z_0), \text{ for } i=1 \text{ to } N, \quad \text{(Equation 3)}$$

where this equation (Equation 3) may be equivalently expressed as the following equation:

$$\left[\frac{r_i^2}{r_0^2} - 1\right] r_0^2 + 2x(x_i - x_0) + 2y(y_i - y_0) + 2z(z_i - z_0) = d_i^2 - d_0^2. \quad \text{(Equation 4)}$$

The above equation (Equation 4) may be simplified by employing a parameter, $\beta_i$, which corresponds to the $i^{th}$ measuring location, and may be expressed as follows:

$$\beta_i = \left[\frac{r_i^2}{r_0^2} - 1\right], \text{ for } i = 1 \text{ to } N. \quad \text{(Equation 5)}$$

In addition, the terms of the above equation (Equation 4) may be converted to matrix form and employ the parameter, $\beta_i$ (from Equation 5). The equation terms may be expressed by matrices P (e.g., representing terms on the left side of the equal sign in Equation 4) and R (e.g., representing terms on the right side of the equal sign in Equation 4) as follows:

$$P = \begin{bmatrix} \beta_1 & 2(x_1-x_0) & 2(y_1-y_0) & 2(z_1-z_0) \\ \beta_2 & 2(x_2-x_0) & 2(y_2-y_0) & 2(z_2-z_0) \\ \ldots & \ldots & \ldots & \ldots \\ \ldots & \ldots & \ldots & \ldots \\ \beta_N & 2(x_N-x_0) & 2(y_N-y_0) & 2(z_N-z_0) \end{bmatrix},$$

$$R = \begin{bmatrix} d_1^2 - d_0^2 \\ d_2^2 - d_0^2 \\ \ldots \\ \ldots \\ d_N^2 - d_0^2 \end{bmatrix}$$

The overall equation (Equation 4) may be represented by the following matrix equation:

$$P \cdot \begin{bmatrix} r_0^2 \\ x \\ y \\ z \end{bmatrix} = R \quad \text{(Equation 6)}$$

The terms $x_i, y_i, z_i$, (for i=0 to N) within matrix P represent the known positions or coordinates in the three-dimensional space where mobile sensor 100 ascertains the received signal strength (RSS) measurements, while the terms $r_0^2$, x, y, and z in the solution matrix are unknown and to be solved by the above equation (Equation 6). The determined values for x, y, and z represent the coordinates (or location) of radio frequency (RF) emitter 120 within the three-dimensional space, while the determined value for $r_0^2$ represents the square of the distance between radio frequency (RF) emitter 120 and the known reference location (e.g., at coordinates $x_0$, $y_0$, and $z_0$ within the three-dimensional space) of mobile sensor 100.

The values for the unknown variables (e.g., $r_0^2$, x, y, and z) indicating the location of radio frequency (RF) emitter 120 may be determined by solving for these variables in Equation 6, thereby providing the following expression:

$$\begin{bmatrix} r_0^2 \\ x \\ y \\ z \end{bmatrix} = (P^T P)^{-1} P^T R, \quad \text{(Equation 7)}$$

where $P^T$ represents the transpose of matrix P, and $(P^T P)^{-1}$ represents the inverse of the product of matrix P and the transpose of matrix P.

In order to determine the unknown variables (e.g., $r_0^2$, x, y, and z) indicating the location of radio frequency (RF) emitter 120 in the above equation (Equation 7), the parameter, $\beta_i$, of matrix P may be estimated based on the measurements of received signal strength (RSS) obtained by mobile sensor 100. Considering the line of sight (LOS) propagation loss between mobile sensor 100 (e.g., unmanned air vehicle (UAV)) and radio frequency (RF) emitter 120, the received signal power, $p_i$ at the $i^{th}$ location along path 110 is inversely proportional to the square law of the distance, $r_i$, between the mobile sensor (e.g., unmanned air vehicle (UAV)) and the radio frequency (RF) emitter. Assuming the power of radio frequency (RF) emitter 120 remains constant during the measurements of received signal strength (RSS) along path 110, the parameter, $\beta_i$, may be estimated based on the received signal strength (RSS) or power measurements as follows:

$$\beta_i = \left[\frac{r_i^2}{r_0^2} - 1\right] \cong \left[\frac{p_0}{p_i} - 1\right], \text{ for } i = 1 \text{ to } N. \quad \text{(Equation 8)}$$

At least four independent equations (or at least four rows of matrices P and R) are required to determine the four unknown variables (e.g., $r_0^2$, x, y, and z) and, hence, the location of radio frequency (RF) emitter 120. However, measurements from at least five locations are required to provide estimates for the parameter, $\beta_i$ (e.g., a reference measurement for $p_0$, and a measurement for each $p_i$, for i=1 to 4).

The estimates for the parameter, $\beta_i$ (for i=1 to N), and the various terms that can be derived from the known measuring locations of mobile sensor 100 (e.g., $x_i, y_i, z_i$ (for i=0 to N); $d_i^2$ (for i=0 to N), etc.) are applied to matrices P and R at step 302. The applied values within matrices P and R are utilized in Equation 7 to determine the values for the unknown variables (e.g., $r_0^2$, x, y, and z) in the solution matrix at step 304. Since there are path loss model errors, signal fading and/or shadowing effects, noise, interference, and implementation errors that impact the measurement, the above determination (Equations 1-7) is formulated to provide a Least Mean Square (LMS) solution for the variables in the solution matrix.

The determined Least Mean Square (LMS) values for x, y, and z within the solution matrix (derived from Equation 7) represent the coordinates of radio frequency (RF) emitter 120 within the three-dimensional space, and are utilized to provide the Least Mean Square (LMS) location of the radio frequency (RF) emitter within that space at step 306. The determined location of the radio frequency (RF) emitter may be used for various applications at step 308. For example, the location information may be processed by processor 230 or forwarded to another system via interface unit 270. The location information may be processed to direct or control a vehicle or other platform to an emitter at a location of interest (e.g., to provide assistance at that location, etc.). Further, the location information may be utilized to generate an image of the area and indicate the emitter locations.

In order to assess the accuracy of the Least Mean Square (LMS) solution, an error vector, $\xi$, representing the error for the Least Mean Square (LMS) solution may be expressed by the following relationship:

$$\xi = P \cdot \begin{bmatrix} r_0^2 \\ x \\ y \\ z \end{bmatrix} - R \quad \text{(Equation 9)}$$

The values for the solved variables (e.g., $r_0^2$, x, y, and z) are utilized to determine the error vector. If a vector, $X_o$, provided Least Mean Square (LMS) values for the unknown variables (e.g., $r_0^2$, x, y, and z), the Least Mean Square (LMS) error vector, $\xi_o$, may be expressed as follows:

$$\xi_o = P \cdot X_o - R \quad \text{(Equation 10)}$$

The transpose of the P matrix must be orthogonal to the Least Mean Square (LMS) error vector, $\xi_o$, thereby providing the following expression:

$$P^T \xi_o = 0 \quad \text{(Equation 11)}$$

Accordingly, the Least Mean Square (LMS) solution vector, $X_o$, must satisfy the orthogonal property, which may be expressed as follows based on the above equations (Equations 10 and 11):

$$P^T \xi_o = P^T P \cdot X_o - P^T R = 0 \quad \text{(Equation 12)}$$

Therefore, the Least Mean Square (LMS) solution vector, $X_o$, may expressed as follows:

$$X_o = (P^T P)^{-1} P^T R \quad \text{(Equation 13)}$$

Substituting the Least Mean Square (LMS) solution vector, $X_o$, into the error equation (Equation 10) gives the following expression for the error vector (e.g., indicating the error of the Least Mean Square (LMS) solution (e.g., values for variables $r_0^2$, x, y, and z from Equation 7) for each of the measuring locations of mobile sensor 100):

$$\xi_o = [P(P^T P)^{-1} P^T - I] R, \quad \text{(Equation 14)}$$

where I is the identity matrix, $(P^T P)^{-1} P^T$ is a projection matrix that projects the matrix R onto the column space of matrix P, and $[(P^T P)^{-1} P^T I]$ is a projection matrix that projects the matrix R onto the orthogonal complement of the column space of matrix P. Geometrically, the projection of the matrix R onto the orthogonal complement of the column space of matrix P assures the orthogonally between the error vector and the column space of matrix P that provides the Least Mean Square (LMS) solution.

Figure 4:
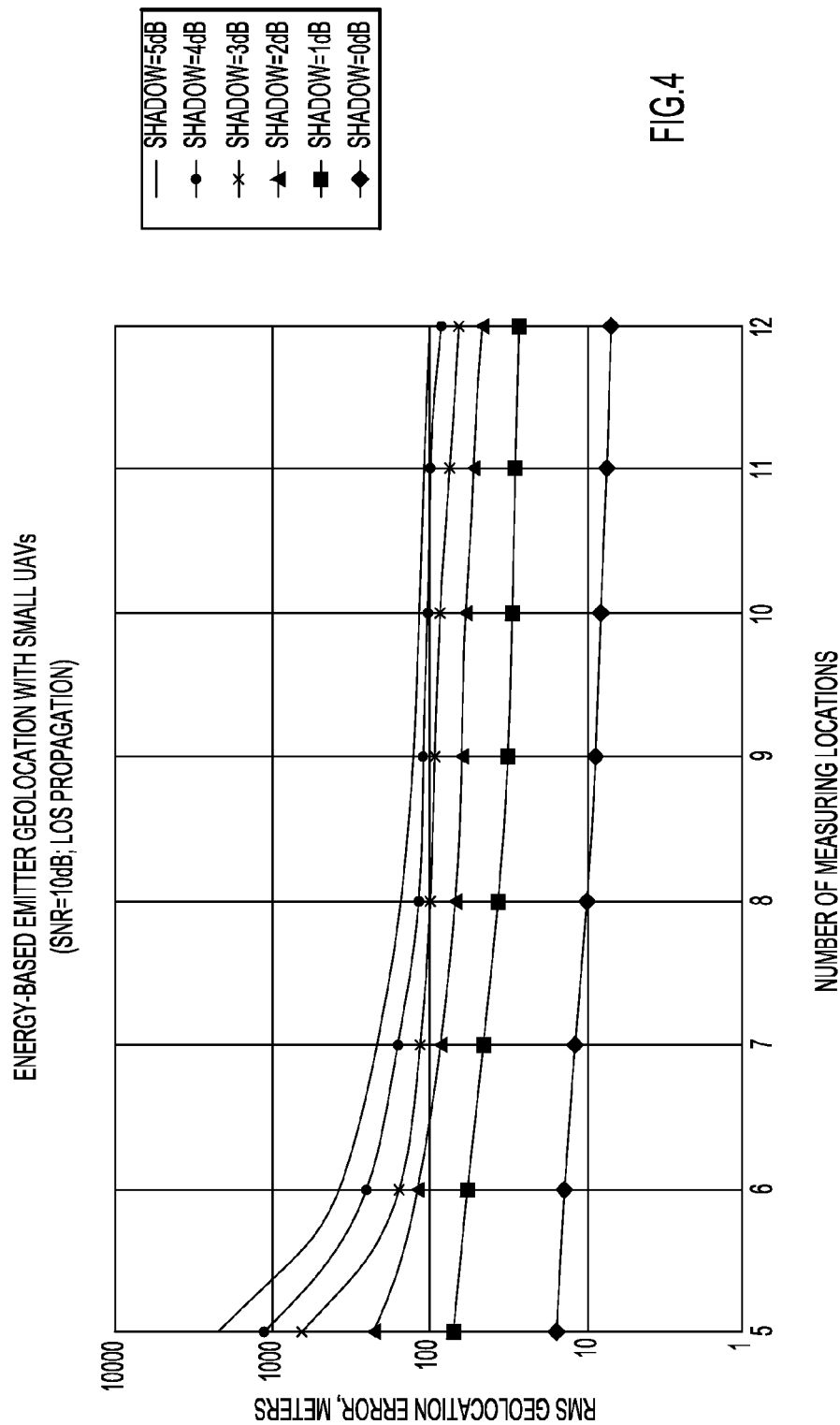
FIG. 4 is a graphical representation of simulation results for an embodiment of the present invention illustrating the relationship between geolocation error and the quantity of locations for received signal strength (RSS) measurements.

The geolocation technique of a present invention embodiment employing small unmanned air vehicles (UAV) has been modeled and simulated using Matlab tools available from The Mathworks, Inc. of Natick, Mass. A graphical illustration of the simulation results providing the relationship between geolocation error and the quantity of locations for received signal strength (RSS) measurements is illustrated in FIG. 4. In the simulation, the locations of an unmanned air vehicle (UAV) were randomly generated, and the following conditions were assumed: the signal to noise ratio (SNR) was 10 dB; the emitter power remained constant during the measurements; the variance of Lognormal shadow varied from 0 to 5 dB; and the path loss follows the line of sight (LOS) law.

As viewed in FIG. 4, a Root Mean Square (RMS) error of the geolocation estimates (e.g., derived from the error vector of Equation 14) for a radio frequency (RF) emitter converges to a robust level with eight or more measuring locations. The geolocation estimates perform well for the variance of Lognormal shadowing less than 2 dB, which is achievable with a line of sight (LOS) path loss condition offered by the unmanned air vehicle (UAV).

Figure 5:
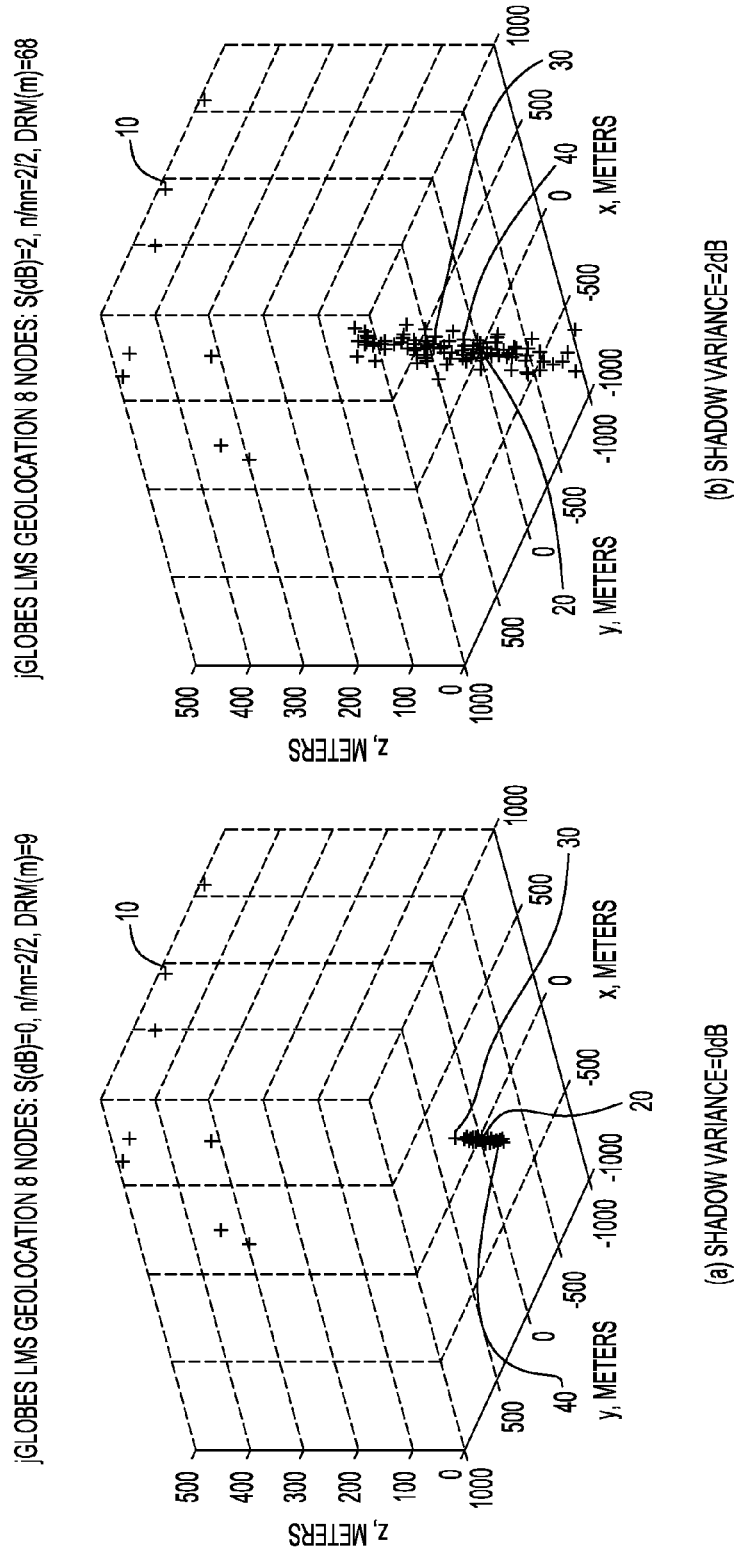
FIG. 5 illustrates representations of simulation results for an embodiment of the present invention showing determined geolocations for a radio frequency (RF) emitter under various conditions.

Two samples of results of a Monte Carlo simulation conducted for various operating scenarios and randomized parameter variations are illustrated in FIG. 5. The simulations provide the geolocation characteristics for eight measuring locations (e.g., indicators 10 as viewed in FIG. 5) and one emitter location (e.g., indicator 20 as viewed in FIG. 5). The simulation was performed for 100 randomized paths with a signal to noise ratio (SNR) of 10 dB, and a variance of Lognormal Shadow of 0 or 2 dB. The simulation shows that the geolocation technique of present invention embodiments provides an unbiased three-dimensional geolocation estimate (e.g., where the geolocation estimates are shown by indicators 30, and the averaged estimate is shown by indicator 40 as viewed in FIG. 5). The simulation results indicate that the present invention geolocation technique is compatible with small unmanned air vehicles (UAV), and provides geolocation estimates of radio frequency (RF) emitters with enhanced reliability.

It will be appreciated that the embodiments described above and illustrated in the drawings represent only a few of the many ways of implementing a system and method for three-dimensional geolocation of emitters based on energy or received signal strength (RSS) measurements.

The environment of the present invention embodiments may include any quantity of mobile sensors, and emitters. The emitters may be implemented by any quantity of any conventional or other devices emitting radio frequency (RF) or any other suitable energy signals (e.g., energy signals in any suitable bands (e.g., infrared, microwave, optical, etc.)). The emitters may be located at any quantity of any desired locations within the three-dimensional space of the environment. The mobile sensors may be implemented by any quantity of any conventional or other mobile or stationary vehicle or platform (e.g., unmanned air vehicle (UAV), air vehicle, ground vehicle, platform or structure mounted at a location or on a vehicle, etc.), and may include any quantity of any conventional or other sensing device (e.g., RF or other sensor, etc.). The mobile sensors may each measure any desired characteristics of emitted signals at any one or more locations within the environment.

The pre-planned path may traverse any desired locations within the environment, where any quantity of measurements may be obtained during traversal of the path. Further, measurements may be obtained at any locations residing within a specified offset or range from the pre-planned path. Alternatively, the path may be determined in random fashion.

The antenna may be implemented by any conventional or other antenna (e.g., omni-directional, directional, etc.) configurable to receive the signals emitted from the one or more emitters. The receiver may be implemented by any conventional or other receiving device capable of receiving the emitted radio frequency (RF) or other energy signals. The radiometer may be implemented by any conventional or other device to measure the energy or received signal strength (RSS) or other characteristics of a received signal. The radiometer may be included within or separate from the receiver.

The processor may be implemented by any quantity of any conventional or other computer systems or processing units (e.g., a microprocessor, a microcontroller, systems on a chip (SOCs), fixed or programmable logic, etc.), and may include any commercially available or custom software (e.g., communications software, location modules, etc.).

It is to be understood that the software (e.g., location modules, etc.) for the processor of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The processor of the present invention embodiments may alternatively be implemented by any type of hardware and/or other processing circuitry. The various functions of the processor may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the processor, receiver, and/or external devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., location modules, etc.) may be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium. Further, the tangible recordable or computer usable medium may be encoded with instructions or logic to perform the functions described herein (e.g., embedded logic such as an application specific integrated circuit (ASIC), digital signal processor (DSP) instructions, software that is executed by a processor, etc.).

The memory may be included within or external of the processor, and may be implemented by any conventional or other memory unit with any suitable storage capacity and any type of memory (e.g., random access memory (RAM), read only memory (ROM), etc.). The memory may store any desired information for performing the geolocation technique of present invention embodiments (e.g., location modules, data, etc.). The interface unit may be implemented by any quantity of any conventional or other communications device (e.g., wireless communications device, wired communication device, etc.), and may be configured for communication over any desired network (e.g., wireless, cellular, LAN, WAN, Internet, Intranet, VPN, etc.).

Present invention embodiments may employ any quantity of variables or equations to determine the estimated location of one or more emitters, provided that the quantity of equations is greater than or equal to the quantity of unknown variables. Further, any conventional or other techniques may be employed to produce the location estimate with minimal error (e.g., Least Mean Square (LMS), etc.). The equations may be represented in any desired form (e.g., matrix form, vectors, scalars, etc.), and be solved in any desired fashion to enable determination of the emitter location. The location estimate may be produced and/or converted to any desired form, and may be provided with respect to any desired reference (e.g., coordinates within the space, longitude and latitude indications, GPS coordinates, etc.).

The resulting location estimate may be utilized for any suitable applications (e.g., generation of a map image of the area, vehicle or other platform guidance systems to direct the vehicle or platform toward or away from areas, radar or other detection systems, etc.).

The various indices (e.g., i, N, etc.) are preferably integers, but may be any types of numbers with any suitable numeric ranges.

It is to be understood that the terms "top", "bottom", "front", "rear", "side", "height", "length", "width", "upper", "lower", "vertical" and the like are used herein merely to describe points of reference and do not limit the present invention to any particular orientation or configuration.

From the foregoing description, it will be appreciated that the invention makes available a novel system and method for three-dimensional geolocation of emitters based on energy or received signal strength (RSS) measurements, wherein locations of radio frequency (RF) emitters in a three-dimensional space are determined based on energy or received signal strength (RSS) measurements of the emitters at various locations.

Having described example embodiments of a new and improved system and method for three-dimensional geolocation of emitters based on energy or received signal strength (RSS) measurements, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for locating an emitter within an area comprising:

an unmanned air vehicle that traverses a pre-planned path through said area to obtain signal strength measurements at a plurality of locations within said area with a line of sight condition that reduces effects from signal fading and shadowing, wherein said unmanned air vehicle includes a receiver to receive signals transmitted by said emitter and obtain a series of measurements of signal strength for said received signals at each of said plurality of different locations within said area; and a processor to process said signal strength measurements to locate said emitter within said area, wherein said processor includes:
- a location module to process said signal strength measurements and select for each location the signal strength measurement with a maximum signal to noise ratio from the series of said signal strength measurements for that location, and determine a three-dimensional location of said emitter within said area based on relationships of distances between said emitter and each of said plurality of locations, wherein said distances are unknown, said selected signal strength measurements are proportional to said unknown distances, and said location module includes:
  - a variable module to determine said three-dimensional location by solving a set of simultaneous equations relating to said distances, wherein said set of simultaneous equations includes a set of variables representing said unknown distances between said emitter and said plurality of locations, and unknown variables representing coordinates of said three-dimensional location of said emitter within said area, and wherein said set of variables representing said unknown distances within said set of simultaneous equations includes values that are approximated by corresponding selected signal strength measurements to solve for said unknown variables and determine said three-dimensional location.

2. The system of claim 1, wherein said variable module solves said set of simultaneous equations using a Least Mean Square technique.

3. The system of claim 1, wherein said location module includes:
a parameter module to determine a parameter for said set of simultaneous equations based on said selected signal strength measurements.

4. The system of claim 3, wherein said parameter is based on a ratio of said selected signal strength measurements.

5. The system of claim 1, wherein said set of simultaneous equations includes:

$$\begin{bmatrix} r_0^2 \\ x \\ y \\ z \end{bmatrix} = (P^T P)^{-1} P^T R, \text{ where}$$

$$P = \begin{bmatrix} \beta_1 & 2(x_1 - x_0) & 2(y_1 - y_0) & 2(z_1 - z_0) \\ \beta_2 & 2(x_2 - x_0) & 2(y_2 - y_0) & 2(z_2 - z_0) \\ \ldots & \ldots & \ldots & \ldots \\ \ldots & \ldots & \ldots & \ldots \\ \beta_N & 2(x_N - x_0) & 2(y_N - y_0) & 2(z_N - z_0) \end{bmatrix},$$

$$R = \begin{bmatrix} d_1^2 - d_0^2 \\ d_2^2 - d_0^2 \\ \ldots \\ \ldots \\ d_N^2 - d_0^2 \end{bmatrix},$$

$$\beta_i = \left[ \frac{p_0}{p_i} - 1 \right],$$

and wherein x, y, z represent said coordinates of said three-dimensional location of said emitter within said area, $r_0^2$ represents a square of a distance between said emitter and a reference location, $x_i, y_i, z_i$, (for i=0 to N) represent coordinates of said locations for obtaining said signal strength measurements, $d_i^2$ (for i=0 to N) represents a square of a distance between a reference origin in said area and said locations for obtaining said signal strength measurements, $p_i$ (for i=0 to N) represents a selected signal strength measurement at said locations, and N represents a quantity of said locations for obtaining said signal strength measurements.

6. The system of claim 1, wherein said signals transmitted by said emitter include radio frequency signals.

7. A method for locating an emitter within an area comprising:
(a) receiving signals transmitted by said emitter via a receiver and obtaining a series of measurements of signal strength for said received signals at each of a plurality of different locations within said area, wherein said receiver is mounted on an unmanned air vehicle, and step (a) further includes:
  (a.1) traversing a pre-planned path through said area with said unmanned air vehicle to obtain said signal strength measurements at said plurality of locations with a line of sight condition that reduces effects from signal fading and shadowing; and
(b) processing said signal strength measurements, via a processor, and selecting for each location the signal strength measurement with a maximum signal to noise ratio from the series of said signal strength measurements for that location, and determining a three-dimensional location of said emitter within said area based on relationships of distances between said emitter and each of said plurality of locations, wherein said distances are unknown, said selected signal strength measurements are proportional to said unknown distances, and step (b) further includes:
  (b.1) determining said three-dimensional location by solving a set of simultaneous equations relating to said distances, wherein said set of simultaneous equations includes a set of variables representing said unknown distances between said emitter and said plurality of locations, and unknown variables representing coordinates of said three-dimensional location of said emitter within said area, and wherein said set of variables representing said unknown distances within said set of simultaneous equations includes values that are approximated by corresponding selected signal strength measurements to solve for said unknown variables and determine said three-dimensional location.

8. The method of claim 7, wherein step (b.1) further includes:
(b.1.1) solving said set of simultaneous equations using a Least Mean Square technique.

9. The method of claim 7, wherein step (b) further includes:
determining a parameter for said set of simultaneous equations based on said selected signal strength measurements.

10. The method of claim 9, wherein said parameter is based on a ratio of said selected signal strength measurements.

11. The method of claim 7, wherein said set of simultaneous equations includes:

$$\begin{bmatrix} r_0^2 \\ x \\ y \\ z \end{bmatrix} = (P^T P)^{-1} P^T R, \text{ where}$$

$$P = \begin{bmatrix} \beta_1 & 2(x_1 - x_0) & 2(y_1 - y_0) & 2(z_1 - z_0) \\ \beta_2 & 2(x_2 - x_0) & 2(y_2 - y_0) & 2(z_2 - z_0) \\ \ldots & \ldots & \ldots & \ldots \\ \ldots & \ldots & \ldots & \ldots \\ \beta_N & 2(x_N - x_0) & 2(y_N - y_0) & 2(z_N - z_0) \end{bmatrix},$$

$$R = \begin{bmatrix} d_1^2 - d_0^2 \\ d_2^2 - d_0^2 \\ \ldots \\ \ldots \\ d_N^2 - d_0^2 \end{bmatrix},$$

$$\beta_i = \left[ \frac{p_0}{p_i} - 1 \right],$$

and wherein x, y, z represent said coordinates of said three-dimensional location of said emitter within said area, $r_0^2$ represents a square of a distance between said emitter and a reference location, $x_i, y_i, z_i$, (for i=0 to N) represent coordinates of said locations for obtaining said signal strength measurements, $d_i^2$ (for i=0 to N) represents a square of a distance between a reference origin in said area and said locations for obtaining said signal strength measurements, $p_i$ (for i=0 to N) represents a selected signal strength measurement at said locations, and N represents a quantity of said locations for obtaining said signal strength measurements.

12. The method of claim 7, wherein said signals transmitted by said emitter include radio frequency signals.

13. A program product apparatus comprising a computer readable memory device with computer program logic recorded thereon for locating an emitter within an area, said program product apparatus further comprising:
 a location module to process signal strength measurements of signals transmitted by said emitter and obtained at a plurality of different locations within said area and select for each location the signal strength measurement with a maximum signal to noise ratio from a series of said signal strength measurements obtained for that location, and to determine a three-dimensional location of said emitter within said area based on relationships of distances between said emitter and each of said plurality of locations, wherein said signal strength measurements are obtained by an unmanned air vehicle that traverses a pre-planned path through said area to obtain said signal strength measurements at said plurality of locations with a line of sight condition that reduces effects from signal fading and shadowing, and wherein said distances are unknown, said selected signal strength measurements are proportional to said unknown distances, and said location module includes:
 a variable module to determine said three-dimensional location by solving a set of simultaneous equations relating to said distances, wherein said set of simultaneous equations includes a set of variables representing said unknown distances between said emitter and said plurality of locations, and unknown variables representing coordinates of said three-dimensional location of said emitter within said area, and wherein said set of variables representing said unknown distances within said set of simultaneous equations includes values that are approximated by corresponding selected signal strength measurements to solve for said unknown variables and determine said three-dimensional location.

14. The apparatus of claim 13, wherein said variable module solves said set of simultaneous equations using a Least Mean Square technique.

15. The apparatus of claim 13, wherein said location module includes:
 a parameter module to determine a parameter for said set of simultaneous equations based on said selected signal strength measurements.

16. The apparatus of claim 15, wherein said parameter is based on a ratio of said selected signal strength measurements.

17. The apparatus of claim 13, wherein said set of simultaneous equations includes:

$$\begin{bmatrix} r_0^2 \\ x \\ y \\ z \end{bmatrix} = (P^T P)^{-1} P^T R, \text{ where}$$

$$P = \begin{bmatrix} \beta_1 & 2(x_1 - x_0) & 2(y_1 - y_0) & 2(z_1 - z_0) \\ \beta_2 & 2(x_2 - x_0) & 2(y_2 - y_0) & 2(z_2 - z_0) \\ \ldots & \ldots & \ldots & \ldots \\ \ldots & \ldots & \ldots & \ldots \\ \beta_N & 2(x_N - x_0) & 2(y_N - y_0) & 2(z_N - z_0) \end{bmatrix},$$

$$R = \begin{bmatrix} d_1^2 - d_0^2 \\ d_2^2 - d_0^2 \\ \ldots \\ \ldots \\ d_N^2 - d_0^2 \end{bmatrix},$$

$$\beta_i = \left[ \frac{p_0}{p_i} - 1 \right],$$

and wherein x, y, z represent said coordinates of said three-dimensional location of said emitter within said area, $r_0^2$ represents a square of a distance between said emitter and a reference location, $x_i, y_i, z_i$ (for i=0 to N) represent coordinates of said locations for obtaining said signal strength measurements, $d_i^2$ (for i=0 to N) represents a square of a distance between a reference origin in said area and said locations for obtaining said signal strength measurements, $p_i$ (for i=0 to N) represents a selected signal strength measurement at said locations, and N represents a quantity of said locations for obtaining said measurements.

18. The apparatus of claim 13, wherein said signals transmitted by said emitter include radio frequency signals.

* * * * *